United States Patent [19]
Asbrand et al.

[11] Patent Number: 5,737,970
[45] Date of Patent: Apr. 14, 1998

[54] SAFETY STEERING COLUMN FOR A MOTOR VEHICLE

[75] Inventors: Ulrich Asbrand, Remshalden; Juergen Class, Illingen, both of Germany

[73] Assignee: Mercedes-Benz AG, Stuttgart, Germany

[21] Appl. No.: 669,636

[22] Filed: Jun. 24, 1996

[30] Foreign Application Priority Data

Jun. 23, 1995 [DE] Germany ............... 195 22 389.6

[51] Int. Cl.⁶ ...................................... B62D 1/19
[52] U.S. Cl. ................................ 74/492; 280/777
[58] Field of Search ............... 74/492; 280/775, 280/777; 188/371

[56] References Cited

U.S. PATENT DOCUMENTS

| | | | |
|---|---|---|---|
| 3,813,961 | 6/1974 | Hug | 74/492 |
| 4,228,695 | 10/1980 | Trevisson et al. | 74/492 |
| 4,297,911 | 11/1981 | Grahn et al. | |
| 4,531,760 | 7/1985 | Patzelt | 280/777 |
| 4,718,296 | 1/1988 | Hyodo | 74/492 |
| 4,746,144 | 5/1988 | Kulczyk | |
| 5,511,823 | 4/1996 | Yamaguchi et al. | 280/777 |
| 5,653,146 | 8/1997 | Barton | 74/492 |

FOREIGN PATENT DOCUMENTS

| | | |
|---|---|---|
| 2 154 910 | 5/1973 | France . |
| 2 315 385 | 10/1974 | Germany . |
| 28 53 374 A1 | 6/1979 | Germany . |
| 28 36 788 A1 | 3/1980 | Germany . |
| 31 36 634 A1 | 7/1982 | Germany . |
| 32 41 839 C1 | 3/1984 | Germany . |
| 34 27 211 C1 | 1/1986 | Germany . |
| 37 29 155 A1 | 3/1988 | Germany . |
| 39 25 989 | 2/1991 | Germany . |
| 5-170110 | 7/1993 | Japan ............... 280/777 |
| 7-117686 | 5/1995 | Japan . |

*Primary Examiner*—Charles A. Marmor
*Assistant Examiner*—Troy Grabow
*Attorney, Agent, or Firm*—Evenson, McKeown, Edwards & Lenahan, P.L.L.C.

[57] ABSTRACT

A safety steering column for a motor vehicle comprising a multi-member steering spindle, of which a portion close to the steering wheel is guided in a steering column tube which is fastened on a cross member largely unaffected in the case of a front collision. A portion of the steering spindle located close to the steering gear is constructed as a deformation member for absorbing an axial displacement of the steering gear. The deformation member is hinged on at one end to the portion of the steering spindle close to the steering wheel and is hinged on the other end to the input shaft of a steering gear. The input shaft of the steering gear has a desired bending point which is designed such that, when the steering gear in the direction of the passenger compartment such as during an accident, first the axial displacement path of the deformation member is largely used up before a buckling deformation starts at the desired bending point. A vehicle-body-fixed supporting element, such as a catch loop, may be provided to support the buckling deformation.

10 Claims, 2 Drawing Sheets

SAFETY STEERING COLUMN FOR A MOTOR VEHICLE

BACKGROUND AND SUMMARY OF THE INVENTION

This invention relates to a safety steering column for a motor vehicle, and more particularly to an axially deformable safety steering column having a multi-member steering spindle arranged between a steering wheel and a steering gear.

A safety steering column of the type generally described above is known, for example from German Patent Document DE 34 27 211 C1. The safety steering column disclosed therein is deformable, having a steering column section which is constructed of two shaft pieces which can be telescopically slid together and which, in the case of a frontal impact, absorbs an axial displacement and to a low extent also impact energy. As a result, in a first phase, after a frontal impact, the upper tube section of the steering column and the steering wheel can be held in their installed position, which is particularly important for an optimal protection efficiency of an inflating air bag. Instead of a deformation member which acts by a telescopic sliding-together, a corrugated tube can also be used as a deformation member.

The deformation member can absorb axial displacement only up to a maximal amount which is limited by the length of the deformation member. It will then be blocked and will transmit further introduced axial forces in a rigid connection to the tube of the steering column. In the case of narrow installation conditions in the forward leg room of the vehicle, it is often not possible to dimension the deformation member as long as would be desirable for an optimal protection of the occupants. In the case of a frontal impact, forces would therefore quickly advance into the steering wheel from the steering gear which is displaced in the direction of the passenger compartment. If the steering column tube breaks out of its holding device, this may result in a dangerous displacement or erection of the steering wheel.

In order to prevent this, it is known from U.S. Pat. No. 4,746,144 (German Patent Document DE 37 29 155 A1) and German Patent Document DE 31 36 634 A1 to provide the deformation member with a break-out mechanism which causes the shaft to break apart when a certain axial force is exceeded and thus mechanically separates the steering gear from the steering spindle. A disadvantage of this solution is that the operation of break-out mechanism depends on many factors which are difficult to calculate so that particularly the long-term behavior is difficult to estimate.

Furthermore, steering arrangements are known from German Patent Documents DE 32 41 839 C1 and DE 28 36 788 A1 in which a receiving tube, which is expanded in a bulging manner, of a telescope-type deformation member also has a desired bending point which, in the case of a frontal impact, not only telescopically absorbs the axial displacement, but also permits a buckling of the input shaft of the steering gear relative to the steering spindle. Such an arrangement considerably reduces the introduction of axial forces by a steering gear moving in the direction of the passenger compartment. However, this solution requires high expenditures and additional space as a resulting of the bulging expansion.

Furthermore, multi-member safety steering columns are known from U.S. Pat. No. 4,297,911 (German Patent Document 28 53 374 A1) and Japanese Patent Document JP-A-07-117 686 which have a deformation element for absorbing axial displacement and additionally a desired bending point in an intermediate shaft close to the steering gear. A disadvantage of these arrangements is that the energy consumption and the deflection of the forces in the case of an impact are hard to estimate because the forces are introduced into the desired bending point by way of a cardan joint. Furthermore, the long sections of the intermediate shaft which, as a lever arm, are applied to the desired bending point require that a comparatively large space is kept free so that, in the case of an impact, the sections of the intermediate shaft may buckle in an unimpaired manner and do not become prematurely blocked.

It is an object of the invention to further develop a safety steering column of the type generally described above such that a dangerous erection of the steering spindle and of the steering wheel is prevented in the case of a front impact, particularly in the case of limited space conditions where axial displacement can be utilized only to a limited extent.

These and other objects have been achieved according to the present invention by providing a safety steering column for a motor vehicle comprising a multi-member steering spindle arranged between and operatively connected with a steering wheel and an input shaft of a steering gear, a first portion of the steering spindle located toward the steering wheel being hinged to a second portion of the steering spindle located toward the steering gear, the second portion being formed as a deformation member which is constructed to allow axial displacement toward the first portion along a displacement path when the steering gear is displaced rearwardly, the second portion being hinged to the input shaft at an end opposite the first portion, wherein the input shaft is constructed with a desired bending point which allows the input shaft to bend when the steering gear is displaced rearwardly.

According to the present invention, a blocking of the deformation member is prevented by constructing the steering gear to first buckle at a desired bending point so that, in the case of a further displacement of the steering gear in the direction of the passenger compartment, hardly any axial forces are further introduced into the steering column. Another advantage of the present invention is that it requires only a slight modification of the safety steering column of the above-mentioned type.

These and other objects, features and advantages of the present invention will become more readily apparent from the following detailed description when taken in conjunction with the accompanying drawings.

DETAILED DESCRIPTION OF THE DRAWINGS

Figure 1A:
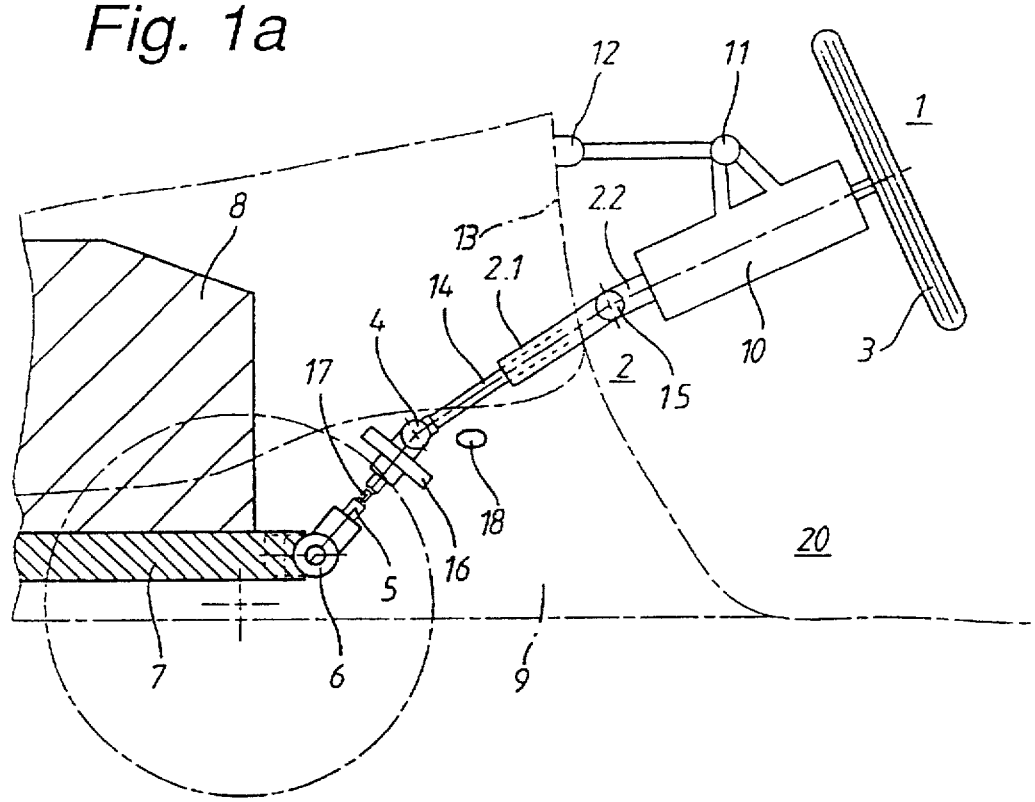
FIG. 1a is a lateral view of the safety steering column according to preferred embodiments of the present invention in its installed position.

The safety steering column 1 shown in FIG. 1a comprises a multi-member steering spindle 2 which is connected at one longitudinal end with a steering wheel 3 and which is connected at an opposite longitudinal end with the input shaft 5 of a steering gear 6 by a joint 4, particularly a knuckle joint or cardan joint. The drawings show portions of a rack and pinion steering system whose steering gear 6 is fastened to an integral carrier 7. The integral carrier 7 carries the engine 8 and is, in turn, fastened to the right-side and left-side side members 9 of the vehicle. The invention can easily also be applied to vehicles having a block steering, in which case the steering gears may be fastened either on the integral carrier or on the longitudinal side member of the vehicle close to the steering wheel.

The portion 2.2 of the steering spindle 2 which is located toward the steering wheel is guided in a steering column tube 10 which, in turn, is fastened on a cross member 11 of the motor vehicle. The cross member 11, hereinafter generically referred to as a holding device, is constructed and mounted to the vehicle such that it is largely unaffected, i.e., not significantly displaced, in a frontal collision. The steering column tube 10 is additionally supported on the front wall of the vehicle by a front wall support 12, hereinafter generically referred to as a holding device. The portion 2.2 of the steering spindle 2 located toward the steering wheel is hinged to the portion 2.1 of the steering spindle 2 located toward the steering gear, which portion 2.1 includes a deformation member 14 having an axial displacement path for absorbing an axial displacement of the steering spindle. According to the illustrated embodiment, this hinged connection takes place by way of a single upper joint 15. However, additional joints and intermediate shafts may be used.

By absorbing an axial displacement of the steering spindle, the deformation member 14 is capable of shortening the length of the steering spindle 2 arranged between the steering gear 6 and the steering column tube 10. The deformation member 14 may be a telescopic structure which slides together, as illustrated in the drawings, or the deformation member 14 may be deformable by plastic deformation, such as the corrugated tube described in the Background and Summary of the Invention. The deformation member 14 is hinged at its longitudinal end located toward the steering gear by the joint 4 and a steering coupling 16 to the input shaft 5 of the steering gear 6. The steering coupling 16 is a vibration damping connection between the steering gear 6 and the steering spindle 2. It has no significance with respect to the following.

According to the invention, the input shaft 5 of the steering gear 6 has a desired bending point 17 which in the illustrated embodiment is defined by a cross-sectional weakening, for example, a section of the input shaft with a smaller cross-sectional area than the rest of the input shaft. Other implementations of the desired bending point are contemplated and well-known to persons of ordinary skill in the art. According to certain preferred embodiments of the invention, a supporting element 18 may be arranged in the path of movement of the steering spindle 2 in the event of a frontal impact. The supporting element 18 forms an abutment which preferably is arranged such that the joint 4 will contact the supporting element when the steering gear 6 is displaced rearward during a frontal impact. The supporting element 18 is fixedly connected with the vehicle frame, for example, to the vehicle side member 9, and is largely unaffected in its position by a frontal impact, in contrast to the steering spindle 2 which can be moved significantly in accident-caused deformations.

Figure 2:
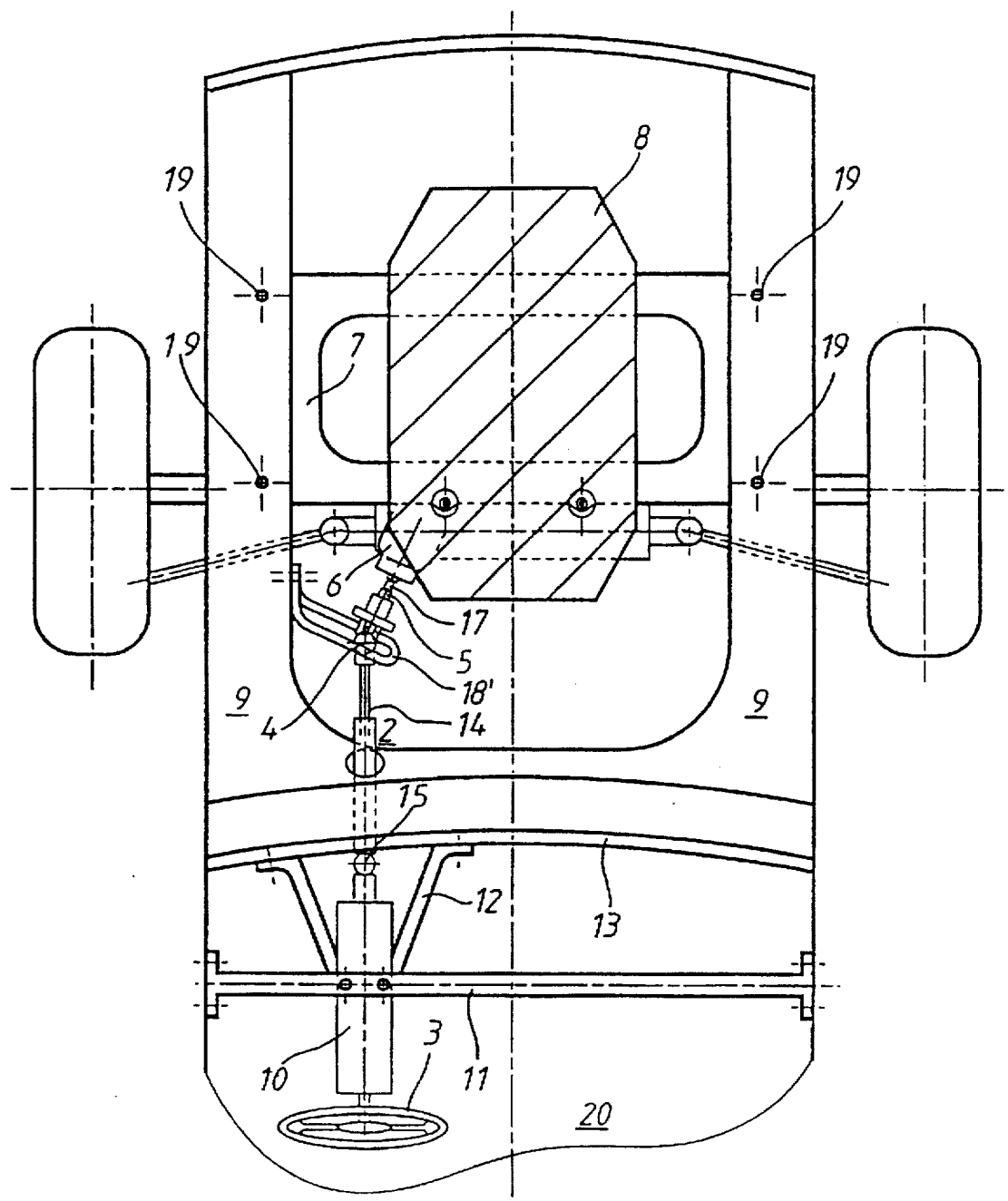
FIG. 2 is a top view of the safety steering column according to FIG. 1a with a catch loop as a supporting element.

In the top view of the safety steering column of FIG. 1a shown in FIG. 2, it is also shown how the integral carrier 7 is fastened by four fastening points 19 on the vehicle side members 9. In the case of a strong frontal impact, the integral carrier 7 will break away completely or partially on these fastening points 19 as a result of the high inert mass of the engine 8 and will be displaced rearwardly, i.e., in the direction of the passenger compartment 20, along with the steering gear 6. Furthermore, FIG. 2 shows the supporting element 18 in a construction of a catch loop 18' which is fastened to the steering-wheel-side side member 9 of the vehicle. The catch loop 18', as described above, acts as an abutment for the steering spindle 2 which is displaced rearwardly in a frontal impact. In addition, the catch loop 18' acts as a guide which prevents an uncontrolled breaking-out of the steering spindle 2 which would result in an undesirable tilting which would change the orientation of the steering wheel and thus the expansion direction of an air bag in the steering wheel. This is particularly important in the case of a frontal impact on only one lateral side of the front of the vehicle. Instead of a catch loop 18, a correspondingly arranged catch bow, catch hook or catch fork, which is adapted with respect to the guiding function, may also be used as a supporting element.

Figure 1B:
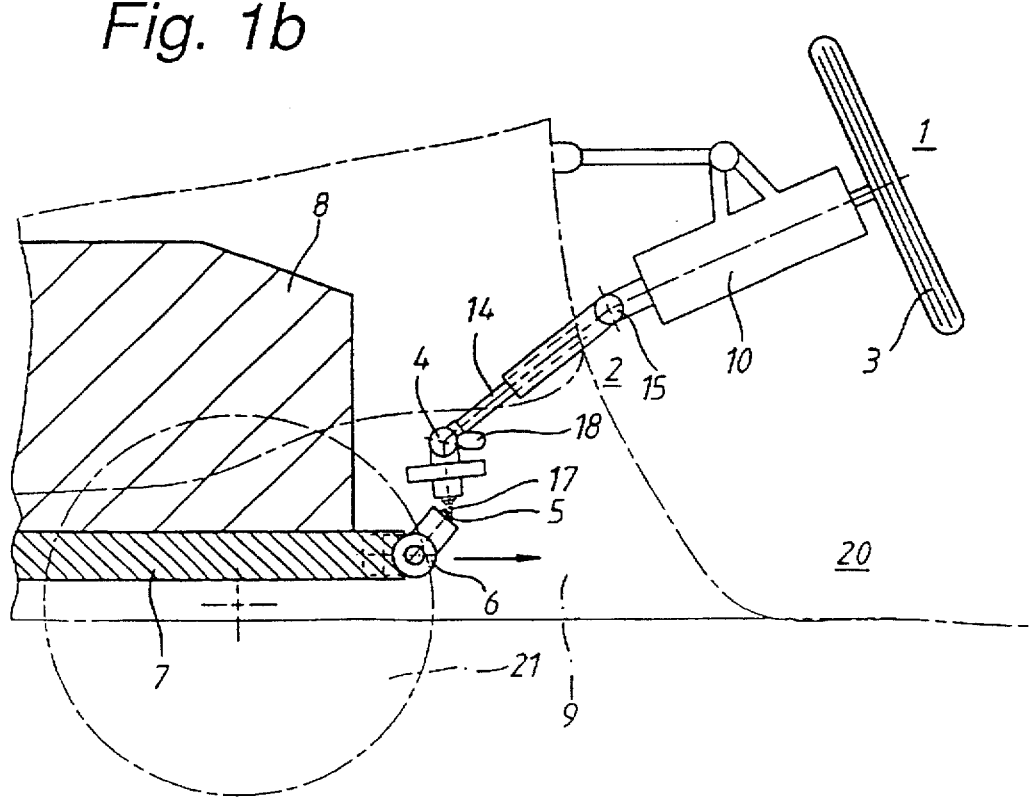
FIG. 1b is a view of the safety steering column according to FIG. 1a after a frontal impact.

FIG. 1b shows the safety steering column 1 of FIG. 1a after a frontal impact and resulting deformations. As a result of the frontal impact, the integral carrier 7 has completely or partially broken away and, together with the engine 8 and the steering gear 6, was displaced rearwardly in the direction of the passenger compartment 20. Depending on the forces and the intensity of the frontal impact, the wheels 21 are more or less displaced along with the integral carrier but, for reasons of simplicity, are shown in an unchanged position. Due to the rearward movement of the steering gear 6, an axial force which acts in the direction of the steering wheel 3 is introduced into the steering spindle 2 which, however, is small, as long as the deformation element 14 can absorb the axial displacement.

Without any additional measures, the deformation element 14 would be blocked when the displacement path of the deformation element is completely used up and the impact force would be transmitted through the rigid steering spindle connection in an undamped manner to the steering column tube 10. In this case, above a critical force, the holding device 11, 12 of the steering column tube 10 could no longer withstand the forces. In order to prevent this from happening, according to the invention, the desired bending point 17 is provided in the input shaft 5 of the steering gear 6. The desired bending point 17 is designed such that, on the one hand, the steering forces can be transmitted but, on the other hand, the buckling deformation starts at the desired bending point 17 before the critical force for the holding device 11, 12 of the steering column tube 10 is exceeded.

The deformation member 14 and the desired bending point 17 may be designed such that, in the case of a rearward movement of the steering gear 6 in the direction of the passenger compartment 20, first the axial displacement path of the deformation member 14 is largely used up before a buckling deformation of the input shaft 5 starts at the desired bending point 17. This has the advantage that the bending of the input shaft 5 of the steering gear 6 starts as late as possible so that the steerability of the vehicle is maintained longer.

The supporting element 18 fixed to the vehicle body advantageously promotes a buckling deformation at the desired bending point 17, at a defined point in the movement of the steering spindle 2. The supporting element 18 is arranged in the movement line of the steering spindle 2 in such a manner that, starting at a defined movement of the steering gear 6 in the direction of the passenger compartment 20, it acts as an abutment upon or above the joint 4. As a result, a force is introduced into the desired bending point 17 in a targeted manner causing the buckling deformation. The supporting element 18 may be fastened, for example, on the vehicle side member 9 close to the steering wheel, as illustrated in FIG. 1b, or to another point which is largely unaffected by accident-caused deformations.

For the above-mentioned reasons, it is advantageous to arrange the supporting element 18 such that the buckling deformation at the desired bending point 17 does not start before the axial displacement path of the deformation member 14 is largely used up.

The sequence of an accident event is now represented as follows. After a frontal impact, the deformation member 14 first absorbs displacement path while it simultaneously swivels about the axis of rotation of the upper joint 15 close to the steering wheel. Before the deformation member 14 is blocked, i.e. before the entire axial displacement path of the deformation member 14 is used up, the supporting element 18 acts as a stop for the swivel movement and as an abutment in the case of a further rearward displacement of the steering gear 6, whereby the buckling deformation is introduced at the desired bending point 17. FIG. 1b shows the situation in which a clear bending has already taken place.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A safety steering column for a motor vehicle comprising a multi-member steering spindle arranged between and operatively connected with a steering wheel and an input shaft of a steering gear, a first portion of said steering spindle located toward the steering wheel being hinged to a second portion of said steering spindle located toward said steering gear, said second portion being formed as a deformation member which is constructed to allow axial displacement toward said first portion along a displacement path when the steering gear is displaced rearwardly, said second portion being hinged to said input shaft at an end opposite said first portion, wherein said input shaft is constructed with a desired bending point which allows the input shaft to bend when the steering gear is displaced rearwardly.

2. A safety steering column according to claim 1, wherein the first portion of said steering spindle located toward the steering wheel is guided in a steering column tube which is fastened to a cross member which is not significantly displaced during a frontal impact to the motor vehicle.

3. A safety steering column according to claim 1, wherein the deformation member and the desired bending point are constructed such that, in the case of a rearward displacement of the steering gear, the deformation member is axially displaced along essentially an entirety of said axial displacement path before said input shaft bends at said bending point.

4. A safety steering column according to claim 3, further comprising a supporting element which is fixed to a body portion of the motor vehicle, said supporting element being arranged as an abutment for contact with one of the steering spindle and the input shaft when the steering gear is displaced rearwardly to initiate bending of the input shaft at said bending point.

5. A safety steering column according to claim 4, wherein the supporting element is arranged such that said one of the steering spindle and the input shaft will not contact the supporting element until the deformation member is axially displaced along essentially an entirety of said axial displacement path.

6. A safety steering column according to claim 5, wherein the supporting element is constructed to guide said steering spindle to prevent an uncontrolled breaking-out and tilting of the steering spindle.

7. A safety steering column according to claim 6, wherein the supporting element is constructed as a catch loop which is fastened to the vehicle frame or a vehicle side member.

8. A safety steering column according to claim 4, wherein the supporting element contacts on or above a joint which connects the steering spindle with the input shaft of the steering gear.

9. A safety steering column according to claim 1, wherein said bending point is a portion of said input shaft with a smaller cross-sectional area than the rest of the input shaft.

10. A safety steering column for a motor vehicle comprising a multi-member steering spindle arranged between and operatively connected with a steering wheel and an input shaft directly connected with a steering gear, a first portion of said steering spindle located toward the steering wheel being hinged to a second portion of said steering spindle located toward said steering gear, said second portion being formed as a deformation member which is constructed to allow axial displacement toward said first portion along a displacement path when the steering gear is displaced rearwardly, said second portion being hinged to said input shaft at an end opposite said first portion, wherein said input shaft directly connected with the steering gear is constructed with a desired bending point which allows the input shaft to bend when the steering gear is displaced rearwardly.

* * * * *